United States Patent
Alawieh et al.

(10) Patent No.: US 11,934,197 B2
(45) Date of Patent: Mar. 19, 2024

(54) METHOD FOR OPERATING A HIGHER-LEVEL AUTOMATED VEHICLE (HAV), IN PARTICULAR A HIGHLY AUTOMATED VEHICLE

(71) Applicant: Robert Bosch GmbH, Stuttgart (DE)

(72) Inventors: Ali Alawieh, Abstatt (DE); Carsten Hasberg, Ilsfeld-Auenstein (DE); Danny Hiendriana, Ludwigsburg (DE); Fabian Dominik Reister, Bad Liebenzell (DE); Jan-Hendrik Pauls, Grossbottwar (DE); Muhammad Sheraz Khan, Heilbronn (DE); Philipp Rasp, Wannweil (DE); Valentin Frommherz, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 587 days.

(21) Appl. No.: 16/628,909

(22) PCT Filed: Jun. 4, 2018

(86) PCT No.: PCT/EP2018/064615
§ 371 (c)(1),
(2) Date: Jan. 6, 2020

(87) PCT Pub. No.: WO2019/007602
PCT Pub. Date: Jan. 10, 2019

(65) Prior Publication Data
US 2020/0192400 A1   Jun. 18, 2020

(30) Foreign Application Priority Data
Jul. 7, 2017   (DE) ..................... 10 2017 211 632.3

(51) Int. Cl.
*G05D 1/02* (2020.01)
*G01C 21/00* (2006.01)
(Continued)

(52) U.S. Cl.
CPC ....... *G05D 1/0274* (2013.01); *G01C 21/3844* (2020.08); *G05D 1/0251* (2013.01);
(Continued)

(58) Field of Classification Search
CPC .. G05D 1/0274; G05D 1/0251; G05D 1/0255; G05D 1/0257; G05D 1/0278;
(Continued)

(56) References Cited

U.S. PATENT DOCUMENTS

2016/0357188 A1* 12/2016 Ansari ................. G05D 1/0274
2018/0058875 A1*  3/2018 Wan .................... G01C 21/3641

FOREIGN PATENT DOCUMENTS

| CN | 102725610 A | 10/2012 |
| CN | 102991437 A | 3/2013 |

(Continued)

OTHER PUBLICATIONS

English translation of Foreign document EP1045224.*
International Search Report for PCT/EP2018/064615, dated Sep. 9, 2018.

*Primary Examiner* — Rami Khatib
*Assistant Examiner* — Shahira Baajour
(74) *Attorney, Agent, or Firm* — NORTON ROSE FULBRIGHT US LLP; Gerard A. Messina

(57) ABSTRACT

A method for operating a higher-level automated vehicle (HAV), in particular a highly automated vehicle, is provided, including: S1 for providing a digital map, which may be a highly accurate digital map, in a driver assistance system of the HAV; S2 for determining an instantaneous vehicle position and localizing the vehicle position in the digital map; S3

(Continued)

for providing an expected setpoint traffic density at the vehicle position; S4 for ascertaining an instantaneous actual traffic density in the surroundings of the HAV; S5 for comparing the actual traffic density to the setpoint traffic density and ascertaining a difference value as the result of the comparison; S6 for checking the vehicle position of the HAV for plausibility at least partially based on the difference value and/or S7 for updating the digital map at least partially based on the difference value. Also described are a corresponding driver assistance system and a computer program.

9 Claims, 1 Drawing Sheet

(51) Int. Cl.
  *G05D 1/00* (2006.01)
  *G08G 1/01* (2006.01)
(52) U.S. Cl.
  CPC .......... *G05D 1/0255* (2013.01); *G05D 1/0257* (2013.01); *G05D 1/0278* (2013.01); *G08G 1/0112* (2013.01); *G08G 1/0116* (2013.01); *G08G 1/0129* (2013.01); *G05D 2201/0213* (2013.01)

(58) Field of Classification Search
  CPC ........... G05D 2201/0213; G01C 21/32; G08G 1/0112; G08G 1/0116; G08G 1/0129
  See application file for complete search history.

(56) References Cited

FOREIGN PATENT DOCUMENTS

| CN | 104002680 A | 8/2014 | |
|---|---|---|---|
| DE | 102011116245 A1 | 4/2013 | |
| DE | 102012212740 A1 | 5/2014 | |
| EP | 1045224 A2 | 10/2000 | |
| EP | 2843641 A1 * | 3/2015 | ....... G08G 1/096741 |
| WO | WO-2017089135 A1 * | 6/2017 | ............ G08G 1/065 |
| WO | WO-2020153985 A1 * | 7/2020 | |

* cited by examiner

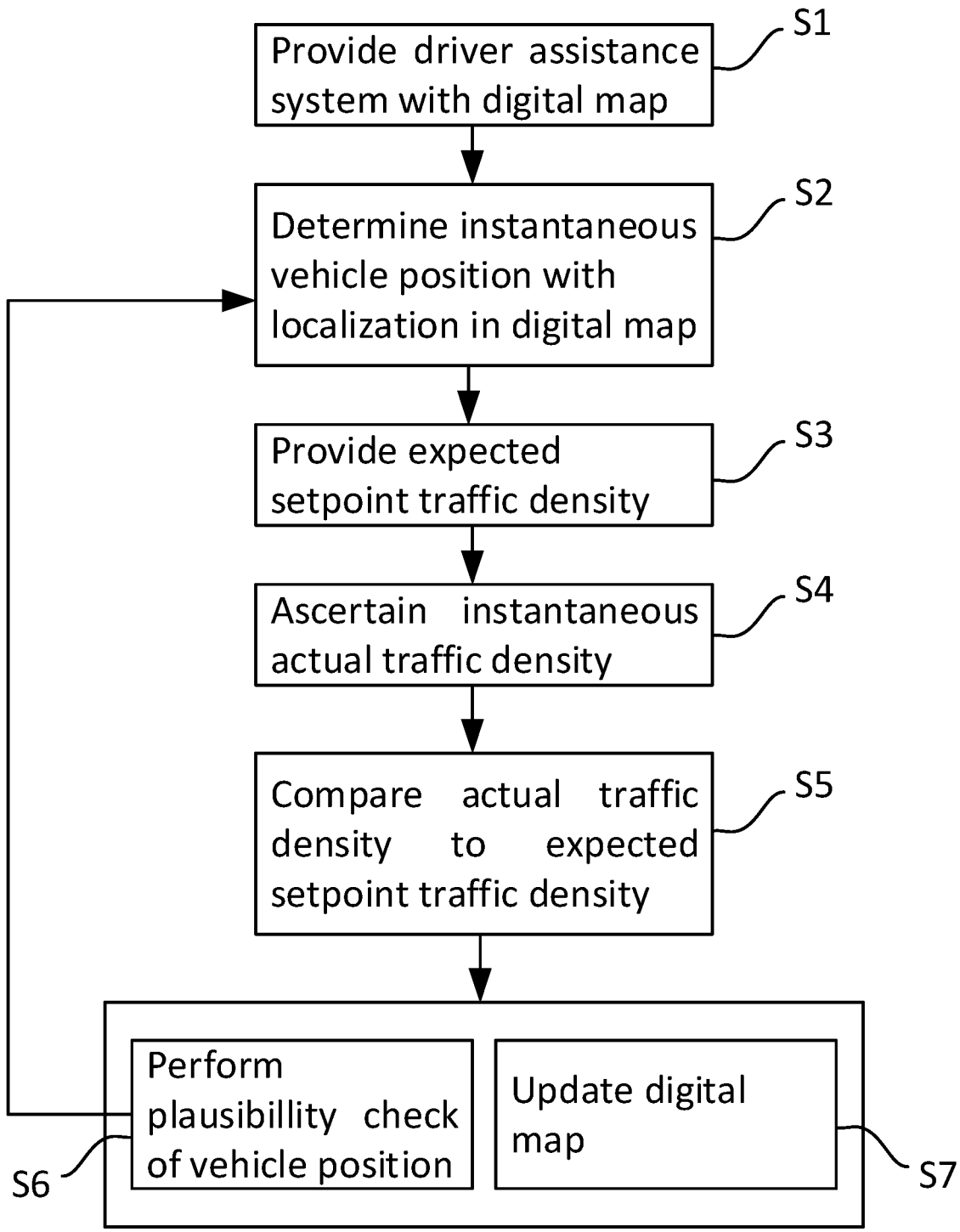

METHOD FOR OPERATING A HIGHER-LEVEL AUTOMATED VEHICLE (HAV), IN PARTICULAR A HIGHLY AUTOMATED VEHICLE

FIELD OF THE INVENTION

The present invention relates to a method for operating a higher-level automated vehicle (HAV), in particular a highly automated vehicle and a driver assistance system for controlling a higher-level automated vehicle (HAV), in particular a highly automated vehicle.

BACKGROUND INFORMATION

With regard to an increase in the degree of automation of vehicles, more and more complex driver assistance systems are being utilized. For such driver assistance systems and functions, such as highly automated driving or fully automated driving, for example, a large number of sensors is required in the vehicle that allow for an exact detection of the vehicle surroundings.

BACKGROUND INFORMATION

In the following, higher-level automated is to be understood to mean all those degrees of automation that correspond to an automated longitudinal and transverse guidance at an increasing system responsibility in the sense of the Federal Highway Research Institute (Bundesanstalt für Straßenwesen, BASt), for example highly and fully automated driving.

In the related art, a plurality of options is provided to carry out a method for operating a highly automated vehicle (HAV). To enhance the localization of a highly automated vehicle (HAV) in a digital map, it is necessary to be able to guarantee the accuracy of the digital map, the problem arising in this case that road changes on short notice caused by construction sites, accidents, or other types of circumstances cannot be taken into account in the digital maps or may be taken into account only incompletely or are on short notice in such a way that a higher-level automated vehicle (HAV), in particular a highly automated vehicle, is not able to retrieve these changes on short notice sufficiently quickly and the driver must take over control of the vehicle. This may be undesirable and potentially also critical with regard to the traffic safety.

In order to control the vehicle in a higher-level automated manner in what may be all situations, it is necessary to have a largely error-free and real-time digital map.

It is known that based on various surroundings sensors, such as radar sensors, cameras, vehicle dynamics sensors, GPS (global positioning system), and digital maps, for example, a representation of the vehicle surroundings, the so-called surroundings model, may be established, the up-to-dateness of a digital map being validated and potentially increased by comparing the sensor data or the surroundings model to the digital map. If the surroundings model and the digital map have noticeable deviations, it is to be assumed that the map is not up to date and may only be used to a limited extent.

In this context, the fact is to be viewed as problematic, however, that the resolution of conventional sensors in the distance is generally low and the road changes to be detected are often small, so that under certain circumstances road changes are not detected in a timely manner and safety-relevant situations occur.

SUMMARY OF THE INVENTION

It is therefore an object of the present invention to provide an improved method for operating a higher-level automated vehicle (HAV), in particular a highly automated vehicle, and an improved driver assistance system for controlling a higher-level automated vehicle (HAV), in particular a highly automated vehicle, in which road changes with regard to a road status stored in a digital map, which is also referred to in short as a map error, may be detected early and reliably.

This object is achieved with the aid of the particular subject matter as described herein. Advantageous embodiments of the present invention are the subject matter of the further descriptions herein.

According to one aspect of the present invention, a method for operating a higher-level automated vehicle (HAV), in particular a highly automated vehicle, is provided, including the following steps:

S1 providing a digital map, which may be a highly accurate digital map, in a driver assistance system of the HAV;

S2 determining an instantaneous vehicle position and localizing the vehicle position in the digital map;

S3 providing an expected setpoint traffic density at the vehicle position;

S4 ascertaining an instantaneous actual traffic density in the surroundings of the HAV;

S5 comparing the actual traffic density to the setpoint traffic density and ascertaining a difference value as the result of the comparison;

S6 checking the vehicle position of the HAV for plausibility at least partially based on the difference value and/or S7 updating the digital map at least partially based on the difference value.

The step of checking the plausibility advantageously includes that in the case that the difference value exceeds an established threshold value of a deviation, step S2 of determining the instantaneous vehicle position and localizing the vehicle position in the digital map is repeated.

According to one specific embodiment it is provided that the step of updating the digital map includes that in the case that the difference value exceeds an established threshold value of a deviation, a piece of information concerning the magnitude of the difference value and/or the actual traffic density is transmitted to a central map server.

According to another specific embodiment, it is provided that the central map server transmits the piece of information concerning the magnitude of the difference value and/or the actual traffic density to further higher-level automated vehicles, this transmission may take place in the form of a map update of the traffic density map and/or of the digital map.

In another specific embodiment, step S3 includes that the setpoint traffic density is provided in the form of a traffic density map, the traffic density map including in particular a traffic density to be expected at different locations as a function of at least one of the parameters, time of day, time of year, weather conditions, and the traffic density map being part of the digital map, in particular.

The traffic density map may be obtained in that information concerning traffic densities at different locations is collected over certain periods of time by higher-level automated vehicles passing through the different locations.

In this way, statistical evaluations may be used to deduce a traffic density map including setpoint traffic densities at different times of day and night as well as at different times of year.

Step S4 advantageously includes that the instantaneous actual traffic density in the surroundings of the HAV is ascertained with the aid of at least one sensor integrated in the HAV or with the aid of at least one external sensor, the at least one external sensor being situated in particular at a light signal system, at a streetlight, at a traffic sign and/or at a further HAV.

The instantaneous actual traffic density in the surroundings of the HAV may thus be detected with the aid of an external sensor, for example a camera, in the surroundings of the further vehicle and be transmitted to the HAV. The instantaneous actual traffic density is then provided to a driver assistance system of the vehicle.

Another subject matter of the present invention is a driver assistance system for controlling a higher-level automated vehicle (HAV), in particular a highly automated vehicle. In this case, the driver assistance system includes at least one sensor that is configured to detect further vehicles in the surroundings of the HAV. Furthermore, the driver assistance system includes a memory module for storing a digital map, which may be a highly accurate digital map, a position module for determining a vehicle position of the HAV, and a control unit. In this case, the memory module is in particular a memory module that is integrated into the HAV or a central server and the position module may be a GPS module. Furthermore, the control unit is configured to exchange data with the sensor, the memory module, and the position module and to localize in the digital map the vehicle position determined by the position module. According to the present invention, it is provided that the control unit is furthermore configured to determine an actual traffic density in the surroundings of the HAV based on the data received from the sensor, to compare the actual traffic density to the expected setpoint traffic density, and to ascertain a difference value as a result of this comparison.

The control unit is advantageously configured to carry out a plausibility check of the vehicle position of the HAV at least partially based on the difference value and/or it is configured to update the map at least partially based on the difference value.

In another specific embodiment, the control unit is furthermore configured to prompt or carry out a repeated determination and localization of the vehicle position in the digital map in the case that the difference value exceeds an established threshold value of a deviation.

The repeated determination and localization of the vehicle position in the digital map may be transmitted to a central server, for example, to provide the server with an instantaneous and accurate digital road map of the surroundings of the vehicle that may also be retrieved and used by further HAVs.

The control unit may be configured to transmit a piece of information concerning the magnitude of the difference value and/or the actual traffic density to a central map server in the case that the difference value exceeds an established threshold value of a deviation.

In one specific embodiment, the memory module includes the setpoint traffic density in the form of a traffic density map, the traffic density map including in particular a traffic density to be expected at different locations as a function of at least one of the parameters, time of day, time of year, weather conditions, and the traffic density map being part of the digital map, in particular.

The at least one sensor is advantageously the at least one sensor that is integrated into the HAV or at least one external sensor, the at least one external sensor being situated in particular at a light signal system, at a streetlight, at a traffic sign and/or at a further HAV.

In one particularly advantageous embodiment, the at least one sensor is based on one of the configurations, a video device, a stereo video device, a 3D camera device, a surround camera device, a time-of-flight (ToF) device, a light-detection-and-ranging (LIDAR) device, a radar device, an ultrasound device or a global-positioning-system (GPS) device.

Another subject matter of the present invention is a computer program that includes a program code for carrying out the method according to the present invention, when the computer program is executed on a computer.

Although the present invention is described in the following mainly in the context of passenger cars, it is not limited thereto, but may be used with any type of vehicle, such as a truck and/or a passenger car.

Other features, possible applications, and advantages of the present invention are derived from the following description of the exemplary embodiments of the present invention, which are illustrated in the figure. It must be noted here that the illustrated features are only descriptive in nature and may be used in combination with the features of other above-described refinements and are not intended to restrict the present invention in any way.

The present invention is elucidated in greater detail in the following based on one exemplary embodiment, the same reference numerals being used for the same features.

BRIEF DESCRIPTION OF THE DRAWING

The FIGURE schematically shows a flow chart of one specific embodiment of the method according to the present invention.

DETAILED DESCRIPTION

The FIGURE shows a flow chart of one specific embodiment of the method according to the present invention for operating a higher-level automated vehicle (HAV), in particular a highly automated vehicle.

A driver assistance system, which is situated in the higher-level automated vehicle (HAV) for the purpose of controlling the higher-level automated vehicle (HAV), includes at least one sensor configured to detect further vehicles in the surroundings of the HAV. Furthermore, the driver assistance system includes a memory module for storing a digital map, which may be a highly accurate digital map, a position module for determining a vehicle position of the HAV, and a control unit. In this case, the memory module is in particular a memory module that is integrated into the HAV or a central server and the position module may be a GPS module. Furthermore, the control unit is configured to exchange data with the sensor, the memory module, and the position module and to localize in the digital map the vehicle position determined by the position module.

In a first step S1, the driver assistance system of the HAV is provided with a digital map, which may be a highly accurate digital map, in a manner known per se.

In a step S2, a determination known per se of an instantaneous vehicle position and localization of the vehicle position takes place in the digital map.

In a step S3, an expected setpoint traffic density at the vehicle position is provided, the setpoint traffic density being provided in the form of a traffic density map, and the traffic density map including in particular a traffic density to be expected at different locations as a function of at least one of the parameters, time of day, time of year, weather conditions. In this case, the traffic density map is in particular part of the digital map.

The traffic density map may be generally obtained in that information concerning traffic densities at different locations is collected over certain periods of time by higher-level automated vehicles passing through the different locations.

In this way, statistical evaluations may be used to deduce a traffic density map including setpoint traffic densities at different times of day and night as well as at different times of year.

In step S4, an instantaneous actual traffic density in the surroundings of the HAV is ascertained with the aid of at least one sensor integrated into the HAV or with the aid of at least one external sensor, the at least one external sensor being situated in particular at a light signal system, at a streetlight, at a traffic sign and/or at a further HAV. In this way, the instantaneous actual traffic density in the surroundings of the HAV may thus be detected with the aid of an external sensor, for example a camera, in the surroundings of the further vehicle and be transmitted to the HAV. The instantaneous actual traffic density is then provided to the driver assistance system of the vehicle and potentially also displayed to the driver of the HAV.

The at least one sensor may be based on one of the configurations, video, stereo video, 3D camera, surround camera, ToF, LIDAR, radar, ultrasound or GPS.

In a further fifth step S5, the actual traffic density is compared to the setpoint traffic density and a difference value is ascertained as a result. On the device side, this happens through the control unit of the driver assistance system.

It may be provided that the piece of information concerning the magnitude of the difference value and/or the actual traffic density is transmitted by the control unit to the central map server, which transmits same information to further higher-level automated vehicles, this transmission may take place in the form of a map update of the traffic density map and/or of the digital map. The control unit is thus configured on the device side to transmit the piece of information concerning the magnitude of the difference value and/or the actual traffic density to the central map server.

Step S6 shown in the FIGURE may take place alternatively or additionally to a step S7 and includes the plausibility check of the vehicle position of the HAV at least partially based on the difference value, the control unit being configured on the device side to carry out this plausibility check of the vehicle position of the HAV at least partially based on the difference value. The step of checking for plausibility may include that in the case that the difference value exceeds an established threshold value of a deviation, step S2 of determining the instantaneous vehicle position and localizing the vehicle position in the digital map is repeated. In this case, the control unit transmits a corresponding request to the position module.

In a further seventh step S7, an update of the digital map may furthermore take place at least partially based on the difference value additionally or alternatively to step S6. Step S7 includes in this case that the piece of information concerning the magnitude of the difference value and/or the actual traffic density is transmitted to a central map server in the case that the difference value exceeds an established threshold value of a deviation.

On the server side, an instantaneous and more accurate digital road map of the surroundings of the vehicle may then be provided that may also be retrieved and used by other HAVs.

By comparing the actual traffic density to the setpoint traffic density, the control unit is advantageously configured to carry out a plausibility check of the vehicle position of the HAV at least partially based on the difference value and/or it is configured to update the map at least partially based on the difference value.

The present invention is not restricted to the described and illustrated exemplary embodiment. It rather includes all refinements by those skilled in the art within the scope of the present invention defined herein.

In addition to the described and displayed specific embodiments, other specific embodiments are conceivable which may include other modifications or combinations of the features.

What is claimed is:

1. A method for operating a vehicle, the method comprising:
    a processor obtaining a digital map;
    the processor obtaining a sensor-based position of the vehicle;
    the processor determining an instantaneous vehicle position in the digital map based on the obtained sensor-based position;
    the processor obtaining an expected setpoint traffic density that is assigned to the instantaneous vehicle position in the digital map;
    the processor using an environmental sensor to obtain an instantaneous actual traffic density in surroundings of the vehicle;
    the processor comparing the obtained instantaneous actual traffic density to the obtained expected setpoint traffic density, thereby obtaining a difference value; and
    in response to the difference value being greater than a predefined threshold, the processor, re-determining the instantaneous vehicle position in the digital map to control an automated drive of the vehicle based on the re-determined instantaneous vehicle position.

2. The method of claim 1, wherein the obtaining of the expected setpoint traffic density is in a form of a traffic density map that includes a traffic density to be expected at different locations as a function of at least one of a time of day, a time of year, and weather conditions.

3. The method of claim 2, wherein the traffic density map is generated based on information concerning traffic densities at different locations collected over periods of time by vehicles passing through the different locations.

4. The method of claim 1, wherein the environmental sensor used to obtain the instantaneous actual traffic density is fixed to a light signal system, a streetlight, or a traffic sign in a region of the determined instantaneous vehicle position in the digital map.

5. A driver assistance system for controlling a vehicle, the driver assistance system comprising:
    at least one sensor to detect further vehicles in the surroundings of the vehicle;
    a memory module storing a digital map;
    a GPS module; and
    a processor, wherein the processor is configured to:
        obtain a sensor-based position of the vehicle from the GPS module;
        determine an instantaneous vehicle position in the digital map based on the obtained sensor-based position;

obtain an expected setpoint traffic density that is assigned to the instantaneous vehicle position in the digital map;

use the at least one sensor to obtain an instantaneous actual traffic density in the surroundings of the vehicle;

compare the obtained instantaneous actual traffic density to the obtained expected setpoint traffic density, thereby obtaining a difference value; and in response to the difference value being greater than a predefined threshold, the processor, re-determining the instantaneous vehicle position in the digital map to control an automated drive of the vehicle based on the re-determined instantaneous vehicle position.

6. The driver assistance system of claim 5, wherein the expected setpoint traffic density is obtained as a traffic density map that includes a traffic density to be expected at different locations as a function of at least one of time of day, time of year, and weather conditions.

7. The driver assistance system of claim 5, wherein the at least one sensor includes a sensor that is integrated into a light signal system, at a streetlight, or a traffic sign in a region of the determined instantaneous vehicle position in the digital map.

8. The driver assistance system of claim 5, wherein the at least one sensor includes:

a video device, a stereo video device, a 3D camera, a surround camera, a time-of-flight (ToF) device, a light-detection-and-ranging (LIDAR) device, a radar device, and/or an ultrasound device.

9. A non-transitory computer readable medium on which are stored instructions that are executable by a processor and that, when executed by the processor, cause the processor to perform a method for operating a vehicle, the method comprising:

obtaining a digital map;

obtaining a sensor-based position of the vehicle;

determining an instantaneous vehicle position in the digital map based on the obtained sensor-based position;

obtaining an expected setpoint traffic density that is assigned to the instantaneous vehicle position in the digital map;

using an environmental sensor to obtain an instantaneous actual traffic density in surroundings of the vehicle;

comparing the obtained instantaneous actual traffic density to the obtained expected setpoint traffic density, thereby obtaining a difference value; and in response to the difference value being greater than a predefined threshold, re-determining the instantaneous vehicle position in the digital map to control an automated drive of the vehicle based on the re-determined instantaneous vehicle position.

\* \* \* \* \*